United States Patent
Joseph et al.

(10) Patent No.: US 9,790,775 B2
(45) Date of Patent: Oct. 17, 2017

(54) STIMULATION WITH NATURAL GAS

(71) Applicant: SCHLUMBERGER TECHNOLOGY CORPORATION, Sugar Land, TX (US)

(72) Inventors: Jijo Joseph, Houston, TX (US); Richard D. Hutchins, Sugar Land, TX (US); William Troy Huey, Fulshear, TX (US); Joel Clinkscales, Sugar Land, TX (US); Philippe Enkababian, Richmond, TX (US); Alejandro Pena, Katy, TX (US); George Waters, Oklahoma City, OK (US); Salvador Ayala, Houston, TX (US); J. Ernest Brown, Sugar Land, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 289 days.

(21) Appl. No.: 14/209,598

(22) Filed: Mar. 13, 2014

(65) Prior Publication Data
US 2014/0262292 A1     Sep. 18, 2014

Related U.S. Application Data

(60) Provisional application No. 61/792,910, filed on Mar. 15, 2013.

(51) Int. Cl.
*E21B 43/26* (2006.01)
*C09K 8/62* (2006.01)

(52) U.S. Cl.
CPC ............... *E21B 43/26* (2013.01); *C09K 8/62* (2013.01)

(58) Field of Classification Search
CPC .................................................. E21B 43/26
See application file for complete search history.

(56) References Cited

U.S. PATENT DOCUMENTS

| | | | |
|---|---|---|---|
| 2,029,478 A | 2/1936 | Haines | |
| 2,716,454 A | 8/1955 | Abendroth | |
| 3,349,847 A * | 10/1967 | Smith | E21B 43/247 166/259 |
| 3,664,422 A * | 5/1972 | Bullen | E21B 43/26 166/283 |
| 3,937,283 A | 2/1976 | Blauer et al. | |

(Continued)

FOREIGN PATENT DOCUMENTS

RU        2442819 C1      2/2012
WO   2012097425 A1      7/2012

OTHER PUBLICATIONS

International Search Report and Written Opinion issued in PCT/US2014/027123 on Aug. 21, 2014, 15 pgs.

(Continued)

*Primary Examiner* — Jennifer H Gay
(74) *Attorney, Agent, or Firm* — Andrea E. Tran

(57) ABSTRACT

Apparatus, systems, and methods in which a fracturing fluid source is in fluid communication with a wellbore extending into a subterranean formation. A compressor has an input in fluid communication with a natural gas source, and has an output in fluid communication with the wellbore. The compressor is operable to compress natural gas received at the input for delivery at the output. A liquefied gas source is also in fluid communication with the wellbore.

20 Claims, 9 Drawing Sheets

(56) References Cited

U.S. PATENT DOCUMENTS

| | | | |
|---|---|---|---|
| 4,384,615 A * | 5/1983 | Luers | B01F 5/0413 137/896 |
| 4,627,495 A | 12/1986 | Harris et al. | |
| 5,105,884 A | 4/1992 | Sydansk | |
| 5,203,834 A | 4/1993 | Hutchins et al. | |
| 5,513,705 A | 5/1996 | Djabbarah et al. | |
| 5,964,295 A | 10/1999 | Brown et al. | |
| 6,192,985 B1 | 2/2001 | Hinkel et al. | |
| 6,258,859 B1 | 7/2001 | Dahayanake et al. | |
| 6,482,866 B1 | 11/2002 | Dahayanake et al. | |
| 6,703,352 B2 | 3/2004 | Dahayanake et al. | |
| 6,838,418 B2 | 1/2005 | Allan et al. | |
| 6,844,297 B2 | 1/2005 | Allan et al. | |
| 7,084,095 B2 | 8/2006 | Lee et al. | |
| 7,261,158 B2 | 8/2007 | Middaugh et al. | |
| 7,279,446 B2 | 10/2007 | Colaco et al. | |
| 7,306,041 B2 | 12/2007 | Milne et al. | |
| 7,320,952 B2 | 1/2008 | Chen et al. | |
| 7,341,980 B2 | 3/2008 | Lee et al. | |
| 7,345,012 B2 | 3/2008 | Chen et al. | |
| 7,378,378 B2 | 5/2008 | Chen et al. | |
| 7,387,986 B2 | 6/2008 | Chen et al. | |
| 7,387,987 B2 | 6/2008 | Chen et al. | |
| 7,402,549 B2 | 7/2008 | Chen et al. | |
| 7,445,761 B1 * | 11/2008 | Alexander | B01D 53/92 423/212 |
| 7,507,693 B2 | 3/2009 | Chen et al. | |
| 7,565,929 B2 | 7/2009 | Bustos et al. | |
| 7,569,522 B2 | 8/2009 | Pena et al. | |
| 7,574,856 B2 | 8/2009 | Mak | |
| 8,127,844 B2 | 3/2012 | Luharuka et al. | |
| 8,794,307 B2 | 8/2014 | Coquilleau et al. | |
| 8,991,499 B2 * | 3/2015 | Nevison | E21B 43/26 166/177.5 |
| 9,181,789 B2 * | 11/2015 | Nevison | E21B 43/26 |
| 2005/0045334 A1 | 3/2005 | Hayes | |
| 2006/0065400 A1 * | 3/2006 | Smith | E21B 43/26 166/308.1 |
| 2006/0166836 A1 | 7/2006 | Pena et al. | |
| 2006/0178276 A1 | 8/2006 | Pena et al. | |
| 2007/0023184 A1 | 2/2007 | Jackson et al. | |
| 2007/0062704 A1 * | 3/2007 | Smith | E21B 43/24 166/303 |
| 2007/0107897 A1 | 5/2007 | Dahanayake et al. | |
| 2007/0129262 A1 | 6/2007 | Gurmen et al. | |
| 2007/0204991 A1 | 9/2007 | Loree et al. | |
| 2007/0215355 A1 | 9/2007 | Shapovalov et al. | |
| 2007/0235189 A1 | 10/2007 | Milne et al. | |
| 2007/0238624 A1 | 10/2007 | Li et al. | |
| 2007/0249505 A1 | 10/2007 | Dahayanake et al. | |
| 2008/0051301 A1 | 2/2008 | Chen et al. | |
| 2008/0066911 A1 | 3/2008 | Luharuka et al. | |
| 2009/0151952 A1 | 6/2009 | Walton | |
| 2010/0051272 A1 * | 3/2010 | Loree | E21B 43/26 166/279 |
| 2010/0243251 A1 | 9/2010 | Luharuka et al. | |
| 2010/0243252 A1 | 9/2010 | Luharuka et al. | |
| 2011/0083903 A1 * | 4/2011 | Ledbetter | E21B 7/025 175/107 |
| 2012/0247776 A1 | 10/2012 | Leshchyshyn et al. | |
| 2013/0014940 A1 * | 1/2013 | Fripp | E21B 43/2406 166/250.06 |
| 2014/0000899 A1 * | 1/2014 | Nevison | E21B 43/26 166/308.1 |
| 2014/0008074 A1 * | 1/2014 | Nevison | E21B 43/26 166/308.6 |
| 2014/0151120 A1 * | 6/2014 | Ledbetter | E21B 21/16 175/24 |
| 2014/0261695 A1 * | 9/2014 | Dehring | E21B 41/00 137/1 |
| 2014/0262292 A1 * | 9/2014 | Joseph | C09K 8/62 166/308.1 |

OTHER PUBLICATIONS

Office Action issued in Chinese Patent Application No. 201480016156.7 dated Jan. 9, 2017; 15 pages. (with English translation).

Office Action issued in Russian Patent Application No. 2015144276 dated Dec. 15, 2016; 14 pages. (with English translation).

Office Action issued in Australian Patent Application No. 2014239976 dated Apr. 20, 2017; 3 pages.

* cited by examiner

STIMULATION WITH NATURAL GAS

CROSS-REFERENCE TO RELATED APPLICATIONS

This application claims the benefit of U.S. Provisional Application No. 61/792,910, entitled "SYSTEM AND METHOD FOR PERFORMING A STIMULATION OPERATION WITH NATURAL GAS," filed Mar. 15, 2013, the entire disclosure of which is hereby incorporated herein by reference.

BACKGROUND OF THE DISCLOSURE

A subterranean formation from which oil, gas, coal bed methane, tar sands, oil shale, and/or shale gas is produced may require stimulation to enhance hydrocarbon flow from the formation, such as to make or keep operations economically viable. Likewise, a subterranean formation utilized for fluid storage or disposal may require stimulation to enhance fluid flow into the formation. Fracturing a subterranean formation to stimulate production or enhance injectability entails pumping high-pressure fluids into the formation via one or more wells extending into and in fluid communication with the formation.

Such high-pressure fracturing fluid may be or comprise an aqueous solution treated with various chemicals, such as surfactants, foamers, cross-linkers, and/or gelling agents. The fracturing fluid may also include proppants, such as bauxite, sand, and/or ceramic particulates. However, some such fracturing fluids aren't without disadvantages. For example, in some parts of the world, the water utilized in creating the fracturing fluid may be difficult and/or expensive to obtain. Existing fracturing fluids may also not be sufficiently environmentally compatible and/or recoverable without also increasing the time in which fracturing operations can be completed, delaying the start of production or commercialization of hydrocarbons from the well, and/or causing hydrocarbons to be lost during or after fracturing operations. Existing fracturing operations also may not economically conserve waste, heat, and/or byproducts in an environmentally friendly and/or cost-effective manner.

SUMMARY OF THE DISCLOSURE

The present disclosure introduces an apparatus comprising a fracturing fluid source in fluid communication with a wellbore extending into a subterranean formation, a natural gas source, and a compressor. The compressor has an input in fluid communication with the natural gas source, and an output in fluid communication with the wellbore, and is operable to compress natural gas received at the input for delivery at the output. A liquefied gas source is also in fluid communication with the wellbore.

The present disclosure also introduces a method comprising conducting natural gas from a natural gas source located at a wellsite to a compressor located at the wellsite. The natural gas is then compressed via operation of the compressor. The compressed natural gas is then mixed with a fracturing fluid received from a fracturing fluid source located at the wellsite, thereby forming a pressurized mixture. A subterranean formation is then fractured by introducing the pressurized mixture into a wellbore extending from the wellsite into the subterranean formation.

These and additional aspects of the present disclosure are set forth in the description that follows, and/or may be learned by a person having ordinary skill in the art by reading the materials herein and/or practicing the principles described herein. At least some aspects of the present disclosure may be achieved via means recited in the attached claims.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
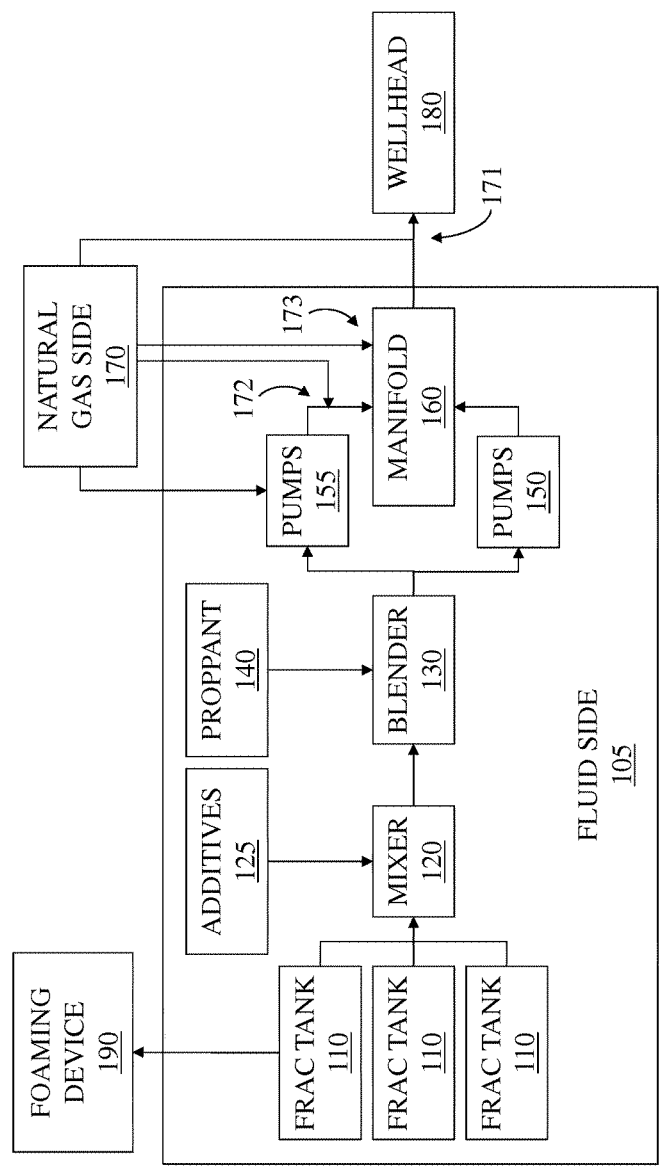
FIG. 1 depicts an overview of an example fracturing operation site in accordance with one or more aspects of the present disclosure.

It should be noted that, in the development of an actual implementation within the scope of the present disclosure, numerous implementation-specific decisions may be made to achieve a predetermined goals, such as compliance with system- and business-related constraints, which may vary from one implementation to another. However, a person having ordinary skill in the art will appreciate that such development may be complex and time consuming, but would nevertheless be a routine undertaking for those of ordinary skill in the art having the benefit of the present disclosure.

Example implementations within the scope of the present disclosure are described below with reference to the accompanying drawings. Numerous details are set forth below to provide a more thorough understanding of various aspects of the present disclosure. However, a person having ordinary skill in the art will appreciate that the example implementations disclosed herein may be practiced without some of these details. In other instances, well-known features may not be described in detail, such as may avoid complicating the following description.

Various terminology and phraseology are used herein for descriptive purposes, and thus may not be limiting in scope. Language such as "including," "comprising," "having," "containing," and "involving," and variations thereof, is intended to be broad and encompass the subject matter listed thereafter, equivalents, and additional subject matter not explicitly recited.

In addition, the present disclosure may repeat reference numerals and/or letters in the various example implementations. This repetition is for simplicity and clarity, and does not in itself dictate a relationship between the various implementations, embodiments, and/or configurations described below.

Implementations within the scope of the present disclosure may relate generally, but not by way of limitation, to well fracturing and well stimulation operations. Implementations within the scope of the present disclosure may also relate to one or more fracturing fluids and/or methods of fracturing a subterranean formation, such as to stimulate production of hydrocarbons from a well and/or to improve permeability of the subterranean formation, such as to facilitate injection of fluids into the well.

The present disclosure introduces at least one new method and/or system for stimulating subterranean formations using a fracturing fluid comprising natural gas, such as liquefied natural gas (LNG), compressed natural gas (CNG), gas hydrates, gelled LNG, foamed LNG, and fracturing fluid foamed with natural gas, among other examples also within the scope of the present disclosure. Fracturing fluid within the scope of the present disclosure may include natural gas that may be obtained from a local source, combined with at least one of LNG, liquefied carbon dioxide, and liquefied nitrogen. Such combination may further comprise proppant and/or fiber. The natural gas source may be disposed within a transportable distance of the wellbore. For example, the natural gas source may produce natural gas from a secondary well located at a distance less than about five kilometers from a compressor employed to provide compressed natural gas for the primary well, such as by being directly or indirectly coupled to the compressor. The natural gas source may also be located in the same subterranean formation as the primary well.

Natural gas is a multi-component gas obtained from a crude oil well (referred to as associated gas) or from a subterranean gas-bearing formation (referred to as non-associated gas). The composition and pressure of natural gas can vary significantly. For example, a natural gas stream may comprise methane ($CH_4$) as a main component. Raw natural gas may also comprise ethylene ($C_2H_4$), ethane ($C_2H_6$), other hydrocarbons, one or more acid gases (such as carbon dioxide, hydrogen sulfide, carbonyl sulfide, carbon disulfide, and mercaptans), and/or minor amounts of water, nitrogen, iron sulfide, wax, crude oil, and/or other contaminants. LNG is natural gas that has been processed to remove nitrogen, water, heavy hydrocarbons (e.g., C7+), and/or other impurities, and then condensed into a liquid at about atmospheric pressure by cooling and depressurization.

Fracturing compositions within the scope of the present disclosure may include a high concentration gas fracturing composition that is a coarse foam. Another example comprises an amphoteric glycinate surfactant, such as may increase viscosity and/or allow viscosity control of the compositions through pH adjustment. Another example fracturing composition comprises a polar base, a polyacrylate, and an activator that ionizes the polyacrylate to a hydroscopic state. Fracturing compositions within the scope of the present disclosure may also comprise carbon dioxide and/or nitrogen utilized to create high gas concentration foams. Another example fracturing composition comprises a liquid propane/nitrogen mixture.

FIG. 1 is a block diagram depicting one or more aspects of a system and/or method for stimulating a subterranean formation using a fracturing fluid comprising natural gas according to one or more aspects of the present disclosure. A portion of FIG. 1 illustrates a generic wellsite set-up 105, also referred to herein interchangeably as the "fluid side" 105, and also referred to in the art as the "proppant injection side" and/or the "water side." The fluid side 105 comprises multiple tanks, referred to herein as "frac" tanks 110, which contain water and/or fracturing fluid. The fluid side 105 may also comprise a mixer 120, which may be or comprise a precision continuous mixer (PCM) and/or other components operable to mix fluid from a supply of additives 125 with the water. The fluid side 105 also comprises a blender 130 operable to mix proppant (such as sand provided by a sand chief and/or other delivery vehicle) with the fluid received from the mixer 120 to form a slurry. The fluid side 105 also comprises a manifold 160 (such as a manifold trailer) connected to multiple high-pressure fracturing pumps ("frac pumps") 150 and 155. The pumps 155 may comprise a combustion engine fueled by natural gas from a natural gas side 170. The manifold 160 and the pumps 150 and 155 are collectively operable to pump the slurry from the blender 130 to a wellhead 180 at the wellsite.

A person having ordinary skill in the art will appreciate that a number of variations may be made to the wellsite set-up 105 shown in FIG. 1 within the scope of the present disclosure. For example, the fracturing fluid may be formed without proppant, such that the blender 130 and/or proppant supply 140 may be omitted. As another example, proppant may be injected downstream of the frac pumps 150 and 155 (the "high pressure side").

The natural gas side 170 is depicted in FIG. 1 as fluidly connecting with the fluid side 105 at an injection point 171 upstream of the wellhead 180 to provide a natural gas component to the fracturing fluid. However, other injection points may also or instead be utilized. For example, others may include one or more of an injection point 172 upstream of the manifold 160, an injection point 173 injecting the natural gas directly into the manifold 160, an injection point (not shown) injecting natural gas directly into an additional manifold separate from the manifold 160, and/or an injection point downstream of the wellhead 180 (not shown, but explained in more detail below with regard to FIG. 8). One or more of the injection points may be buried underground for safety purposes, as the injection pressure may be about 15,000 psi or more for a deep well. The pressure differential at one or more of the injection points may be managed so as to prevent gas from entering the liquid stream and potentially damaging the frac pumps 150 and 155, piping seals, and/or other equipment. For example, the fracturing fluid into which the natural gas is injected may be maintained at a higher pressure relative to the pressure of the injected natural gas. Although not depicted in the drawings, it should also be noted that the natural gas side 170 may not connect with the fluid side 105, and may instead be operated independently to stimulate a subterranean formation.

FIGS. 2-7 are block diagrams depicting various implementations of the natural gas side 170 shown in FIG. 1. Each implementation depicts a natural gas source 210, which may be or comprise one or more of a pressure vessel containing LNG, CNG, or gas hydrates. The natural gas source 210 may be or comprise one or more of a static structure, a mobile unit carried by a tanker truck, a tanker vessel for offshore wells, a pressure vessel located at the sea floor, a train car, and/or a pipeline for on-site delivery from one or more surrounding wells. The natural gas source 210 may contain about 4,500,000 SCF (standard cubic feet) of natural gas to be utilized during one or more fracturing stages. Where LNG is stored or delivered as part of the natural gas source 210, a fracturing stage may include two or three queen transports to transport the LNG. A nitrogen queen storage may contain 23,000 gallons of liquid nitrogen at a pressure of about 45 psia, assuming one gallon of LNG is equivalent to about 82.6 SCF of natural gas.

A natural gas source that is replenished by surrounding local wells and used for fracturing a subterranean formation and/or fueling the equipment used to fracture the formation can provide significant cost and environmental savings. However, the varying degrees of efficiency for compressing natural gas can have a direct impact on the cost and/or environmental savings. Each of the implementations depicted in FIGS. 2-7 addresses such efficiencies in varying capacities.

Figure 2:
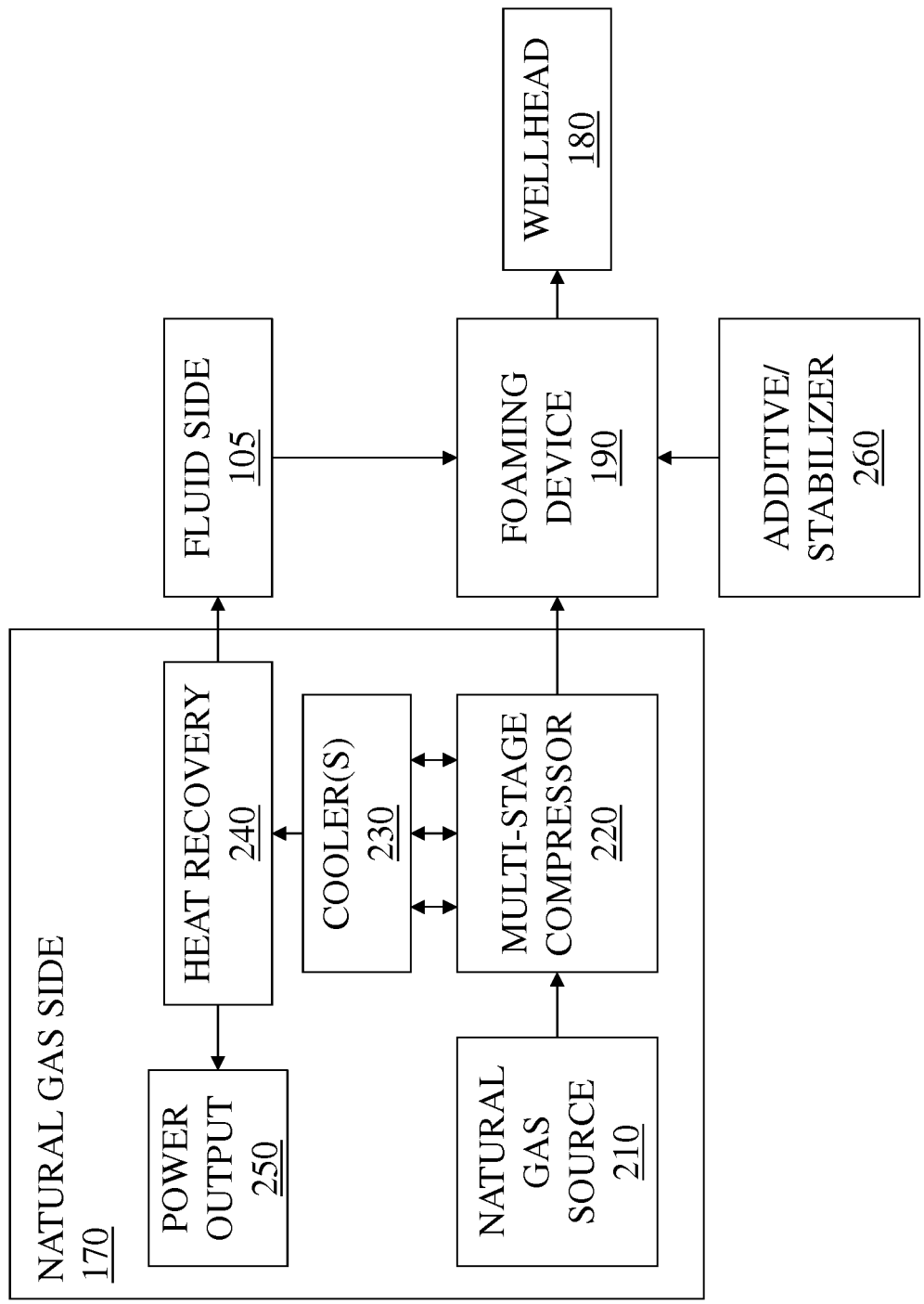
FIGS. 2-7 depict various example implementations of a natural gas side of a fracturing operation in accordance with one or more aspects of the present disclosure.
Figure 3:
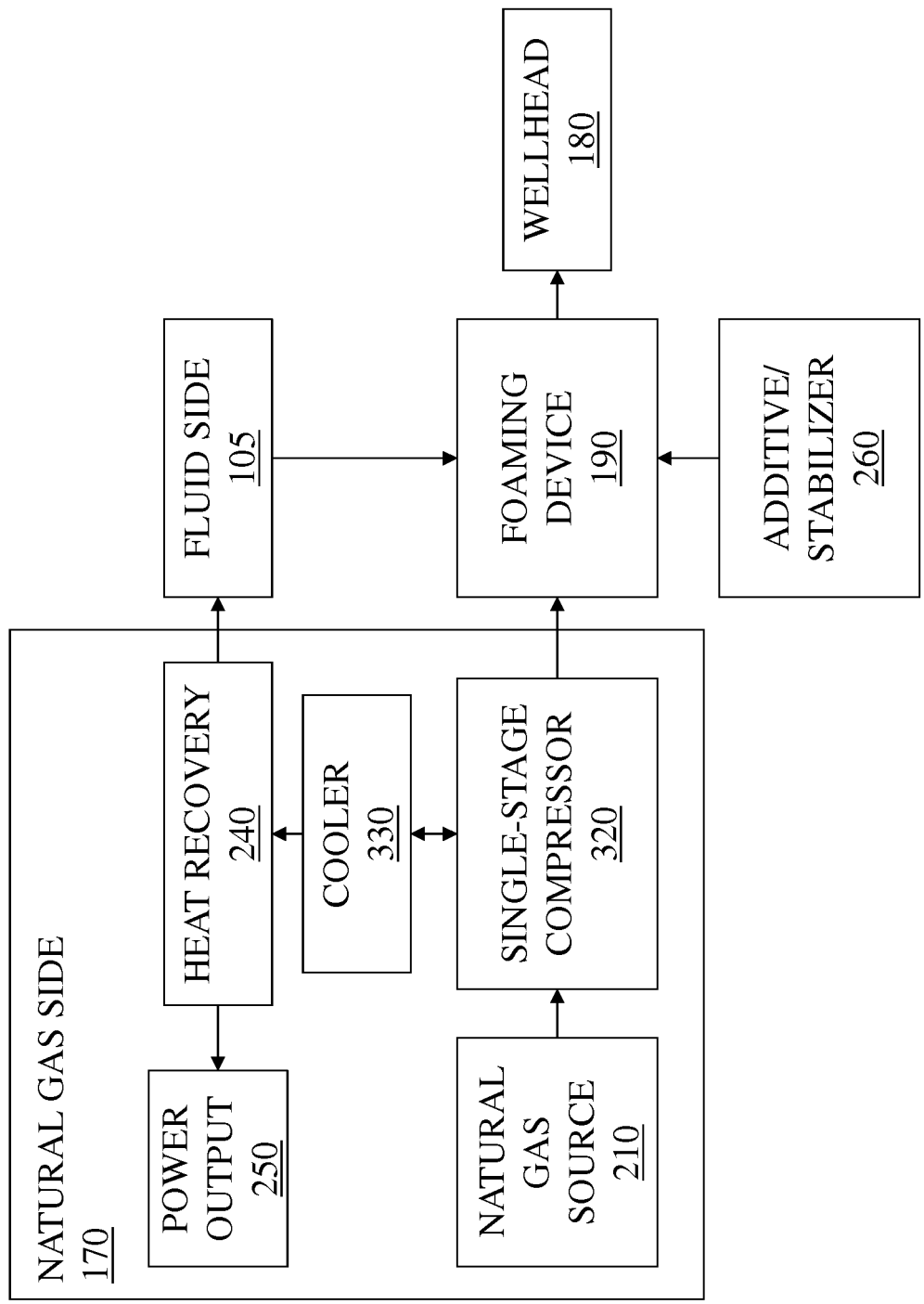

A compression device to create compressed natural gas on location, such as a multi-stage compressor 220, as illustrated in FIG. 2, or a single stage compressor 320 as illustrated in FIG. 3, may be in fluid communication with the natural gas source 210 of FIGS. 2-7. For example, in FIG. 2, the multi-stage compressor 220 may increase the pressure of the natural gas provided from the natural gas source 210 to a pressure suitable for delivery to the wellhead 180. That is, the natural gas provided from the natural gas source 210 may have a pressure ranging between about 500 psia and about 1,000 psia, and a temperature of about 80 deg F. (degrees Fahrenheit). The multi-stage compressor 220 may increase the pressure of the natural gas to a pressure ranging between about 7,500 psia and about 9,000 psia, which may cause a rise in temperature to between about 200 deg F. and about 215 deg F. The thermal energy generated by the multi-stage compressor 220 may be utilized by a heat recovery system 240 during fracturing operations within the wellbore. The heat recovery system 240 may generate an electrical or mechanical power output 250 from the thermal energy generated by the compressor.

The heat recovery system 240 may be in fluid communication with the multi-stage compressor 220 by one or more coolers 230. For example, as depicted in FIG. 2, the multi-stage compressor 220 may have three stages, each in fluid communication with one or more coolers 230. The heat recovery system 240 may recover the heat output by the multi-stage compressor 220 directly or via the one or more coolers 230. Heat from the one or more coolers 230 recovered by the heat recovery system 240 may be utilized to alter the temperature of water in the fluid side 105, such as to assist in managing the temperature of the compressed natural gas. Heat rejected from the compressor 220 and recovered in the heat recovery system 240 may also or instead be utilized during various applications relying on a temperature differential. For example, the heat recovery system 240 may be utilized to provide an electrical and/or mechanical power output 250 to be utilized by one or more other components of the fluid side 105 and/or the natural gas side 170 shown in FIGS. 1-7, and/or other components at the wellsite. The heat recovered by the heat recovery system 240, and/or the electrical and/or mechanical power output thereby, may also be utilized to heat water in the frac tanks 110 and/or to provide comfort heating to personnel at the wellsite, such as when the wellsite is located in cold weather environments like Canada and Russia.

The multi-stage compressor 220 and other compression devices shown in FIGS. 2-7 may be powered by a power source, such as a turbine or combustion engine, which may be powered by diesel, electricity, natural gas (perhaps from a local source), and/or other fuels. The multi-stage compressor 220 and other compression devices shown in FIGS. 2-7 may be or comprise positive displacement compressors, centrifugal compressors, and the like, of varying volume, pressure, and/or temperature of the natural gas. The horsepower (HP) utilized to achieve the desired pressure, volume, and/or temperature levels may range between about 6,000 HP and about 19,000 HP.

The multi-stage compressor 220 and other compression devices shown in FIGS. 2-7 may be integrated with interstage coolers and/or refrigeration system operable to lower the temperature of the natural gas at each outlet and thereby reduce the horsepower utilized for each compression stage. For example, the single-stage compressor 320 of FIG. 3 may be in fluid communication with an after-cooler and/or refrigeration system 330 operable to lower the temperature of the natural gas output of the single-stage compressor 320. The one or more coolers 230 and/or 330 shown in FIGS. 2 and 3, as well as others described below or otherwise within the scope of the present disclosure, may be operable to lower the temperature of the natural gas output to below the boiling point of water, such that a water component of the fracturing fluid does not boil when placed in contact with the natural gas stream.

In addition to the one or more coolers 230 and/or 330 shown in FIGS. 2 and 3, or in lieu thereof, the temperature of the natural gas at the outlet of the compressor 220/320 may be cooled by water received from frac tanks, such as the frac tanks 110 shown in FIG. 1. Chemical-aided cooling may also or instead be utilized, such as where ethanol, methanol, other alcohols, and/or other cooling chemicals are added to the natural gas stream to remove latent heat from the system.

FIGS. 2-5 and 7 also depict a foaming device 190 utilized, for example, to mix the compressed natural gas from the natural gas side 170 with the fracturing fluid from the fluid side 105, such as to produce a foamed fracking fluid for delivery to the wellhead 180. A polymer additive and/or stabilizer source 260 may introduce a cross-linked polymer stabilizer and/or other polymer additives and/or polymer stabilizers to the foaming device 190. The foaming device 190 may also be in fluid communication with a fracturing fluid source (e.g., the frac tanks 110 shown in FIG. 1) for mixing with the compressed natural gas prior to injection into the wellhead 180. However, the natural gas may reduce or substantially eliminate the water utilized to produce the foam.

Figure 4:
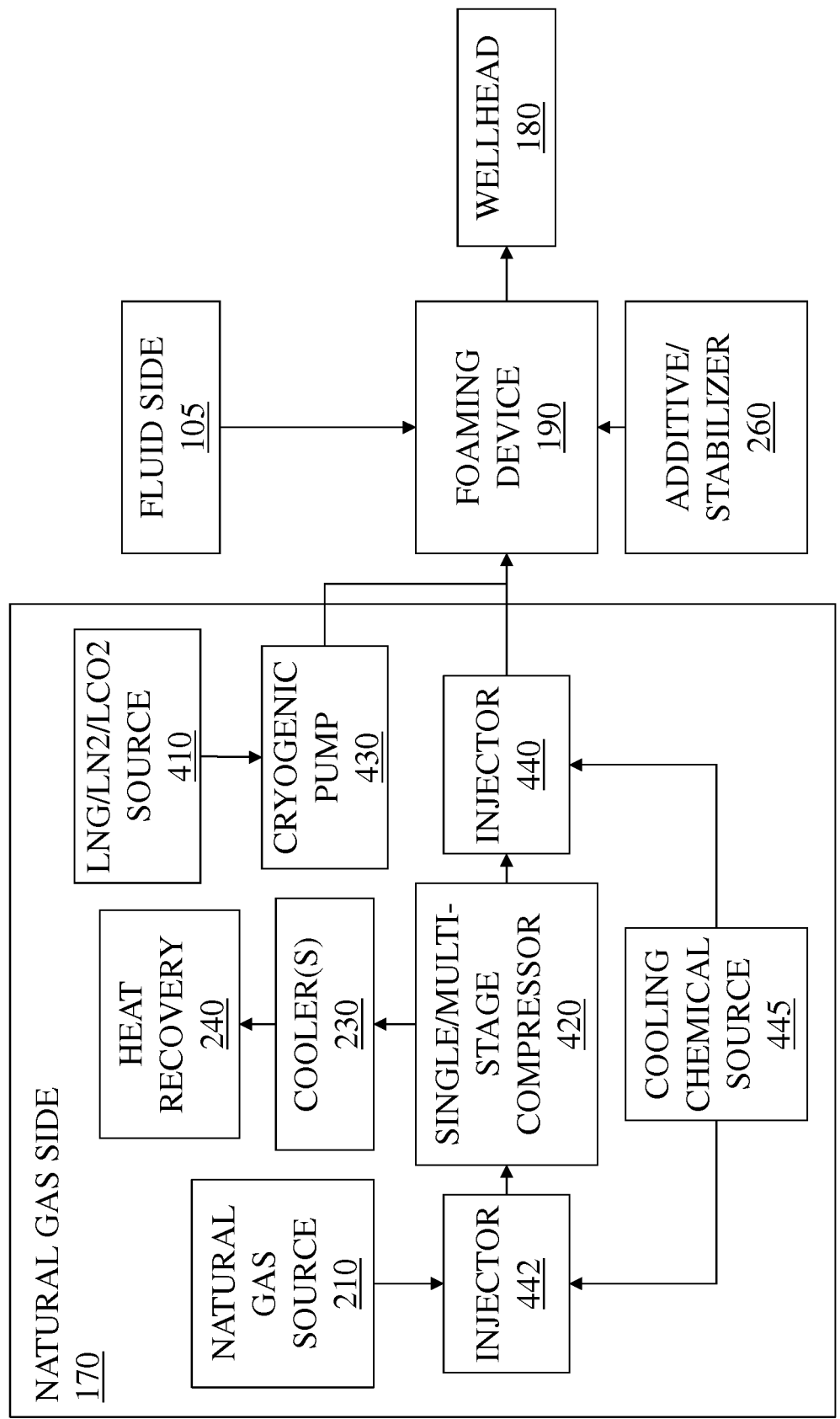

As depicted in FIG. 4, the natural gas side 170 may also comprise a cryogenic pump 430 coupled to an LNG, liquefied nitrogen (LN2), or liquefied carbon dioxide (LCO2) source, which may be utilized to cool the compressed natural gas before delivery to the wellhead 180. The cryogenic pump 430 may pressurize the LNG, LN2, or LCO2 at a pressure substantially equal to or greater than an inlet and/or an outlet pressure of the single/multi-stage compressor 420, depending on whether the outlet of the cryogenic pump 430 is coupled before or after the compressor 420.

As with the implementations described above, the single or multi-stage compressor 420 of FIG. 4 may be connected to or integrated with a cooler/refrigeration system 230 and/or a heat recovery system 240. However, injecting LNG into the natural gas stream may reduce the temperature of the compressed natural gas at the outlet of the compressor 420. LNG is a variable mixture of about 75-95% liquefied methane (CH4) and 5-15% ethane (C2H6), with the remainder composed of other hydrocarbons such as propane (C3H8) and/or butane (C4H10), among others. Liquefied methane has a melting point of about −182.5 deg C. (degrees centigrade, 296.5 deg F.) and a boiling point of about −161.6 deg C. (−259 deg F.). Accordingly, one or more cryogenic pumps 430 may be utilized to pump the LNG into the natural gas stream. The LNG may also or instead be LN2 and/or LCO2. The one or more cryogenic pumps 430 may pump the LNG, LN2, and/or LCO2 from an LNG/LN2/LCO2 source 410 into the compressed natural gas stream at a pressure substantially equal to or greater than the outlet pressure of the compressor 420, such as at a pressure ranging between about 7,500 psia and about 9,000 psia.

As described above, a cooling-chemical source 445 may also (or instead) be utilized to reduce the temperature of the compressed gas. For example, ethanol, methanol, other alcohols, LNG, LN2, LCO2, and/or other cooling-chemicals may be injected into the compressed natural gas stream by an injector 440 fluidly disposed between the compressor 420 and the foaming device 190. For example, the injected cooling chemical(s) may have a low boiling point and/or high latent heat, perhaps roughly comparable to or greater than that of methanol or ethanol, and may thus remove latent heat from the compressed natural gas at the output of the compressor 420. The cooling-chemical source 445 may also or instead be injected into the natural gas stream before compression via, for example, an injector 442 having an output in fluid communication with the compressor 420. The injector 442 may also be fluidly connected between the natural gas source 210 and the compressor 420, although the natural gas source 210 may also or instead be connected to the compressor 420 without the intervening injector 442.

Figure 5:
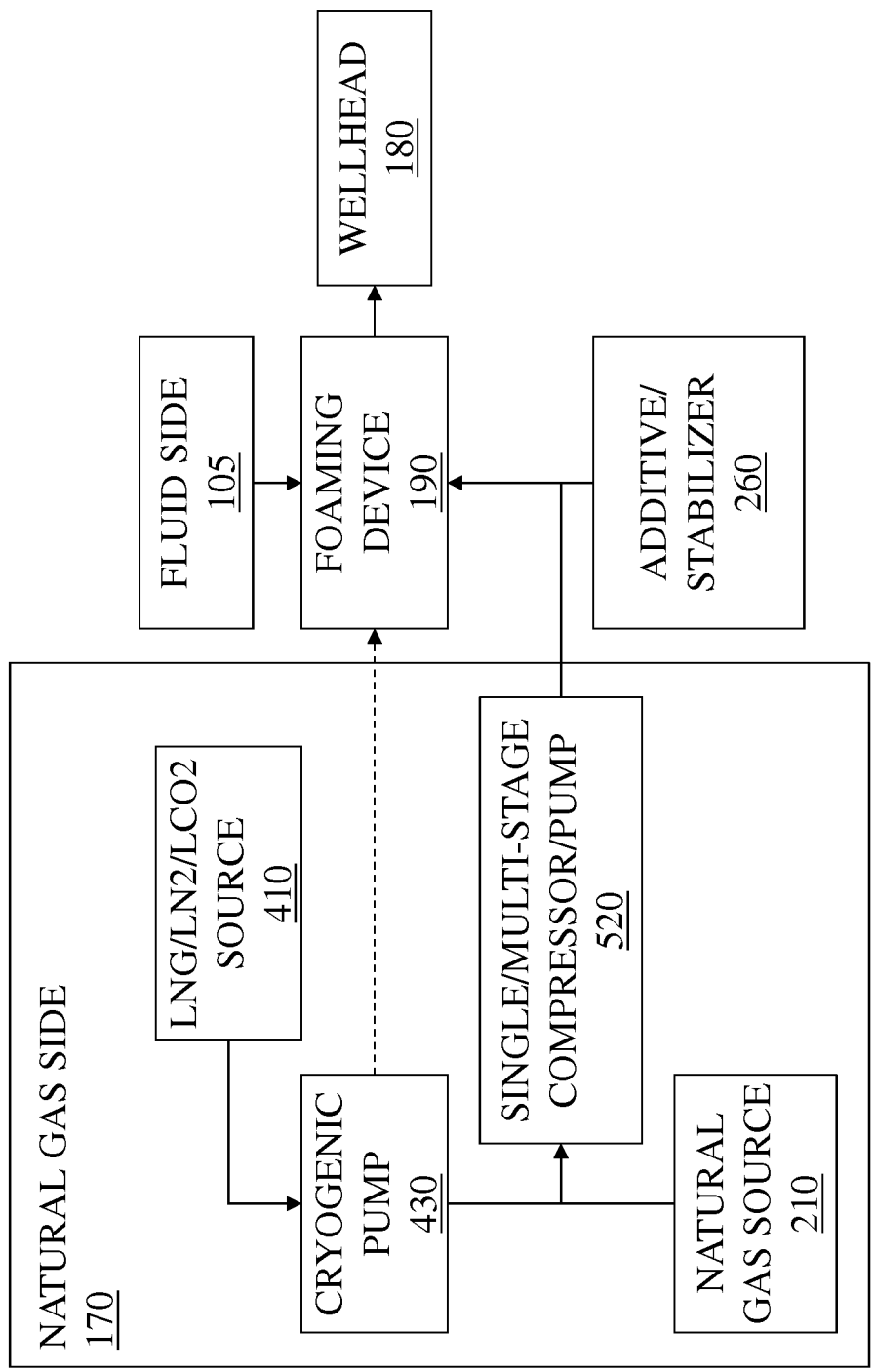

The implementation depicted in FIG. 5 similarly comprises a single or multi-stage compressor or pump 520 fed by a natural gas source 210 and, via the cryogenic pump 430, the LNG/LN2/LCO2 source 410. The cryogenic pump 430 may also inject LNG, LN2, and/or LCO2 into the foaming device 190. As described above, lowering the temperature of the natural gas prior to one or more compression stages may reduce the horsepower utilized to compress/pump the natural gas to a suitable pressure for injection into the wellhead 180 and downhole. The ratio of LNG to CNG and the inlet pressure at the compressor 520 may also affect the outlet temperature and horsepower utilized to attain the outlet pressure.

Figure 6:
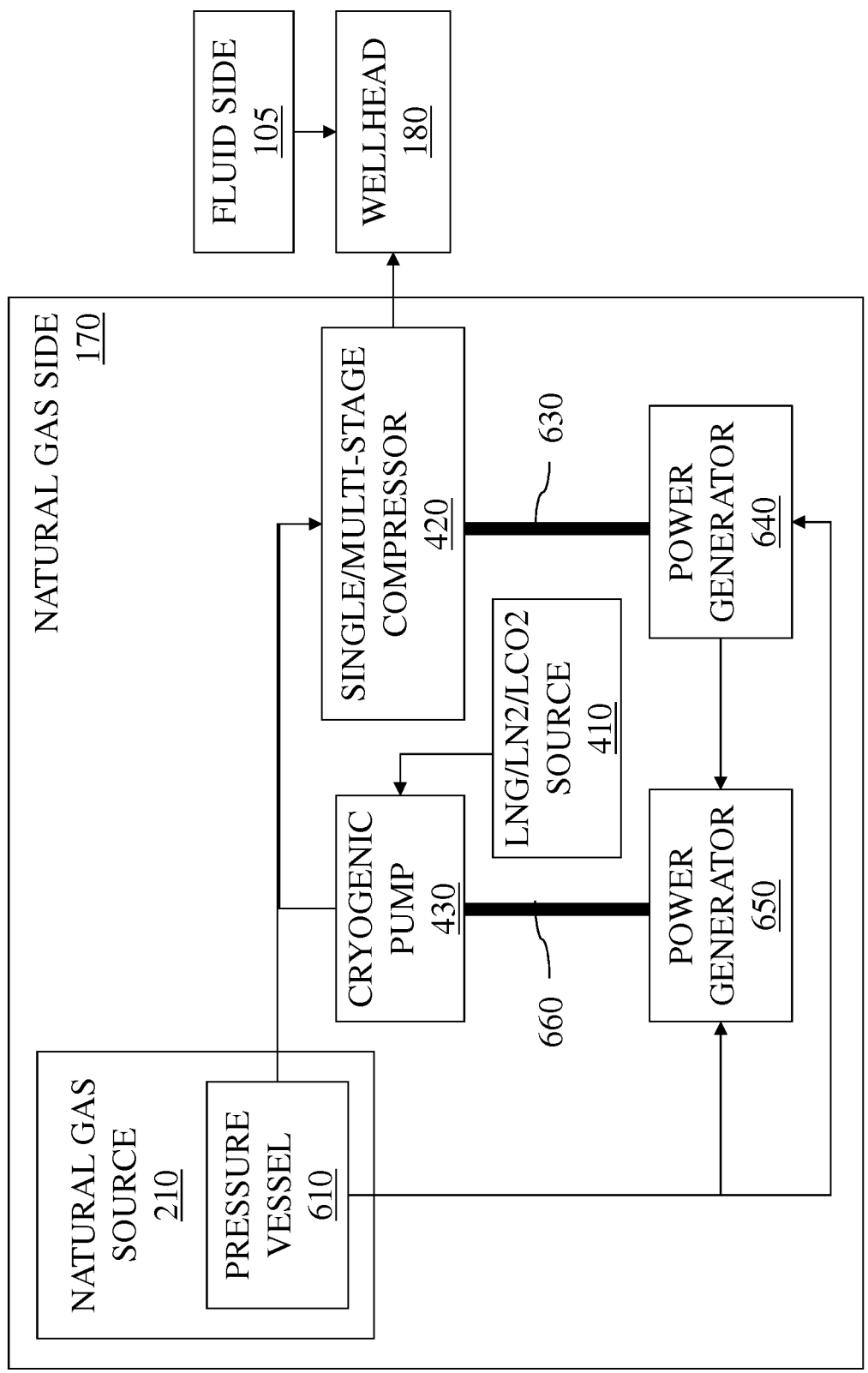

The implementation depicted in FIG. 6 similarly comprises a natural gas source 210, an LNG/LN2/LCO2 source 410, a single/multi-stage compressor 420, and the cryogenic pump 430. The implementation depicted in FIG. 6 (as well as those depicted in FIGS. 1-5) may also comprise a pressure vessel 610 for local storage of natural gas. The pressure vessel 610 may contain LNG, CNG, or a gas hydrate.

The implementation depicted in FIG. 6 also comprises a first turbine drive, combustion engine, and/or other power generator 640 operable to power the single/multi-stage compressor 420 coupled thereto by a rotating shaft 630. A second turbine drive, combustion engine, and/or other power generator 650 may be operable to power the cryogenic pump 430 via a corresponding rotating shaft 660. The first and second power generators 640 and 650 may be powered by natural gas received from the pressure vessel 610 of the natural gas source 210. Hot exhaust gas generated by the first power generator 640 may be used (via a secondary recovery system, not shown) to drive the second power generator 650.

Figure 7:
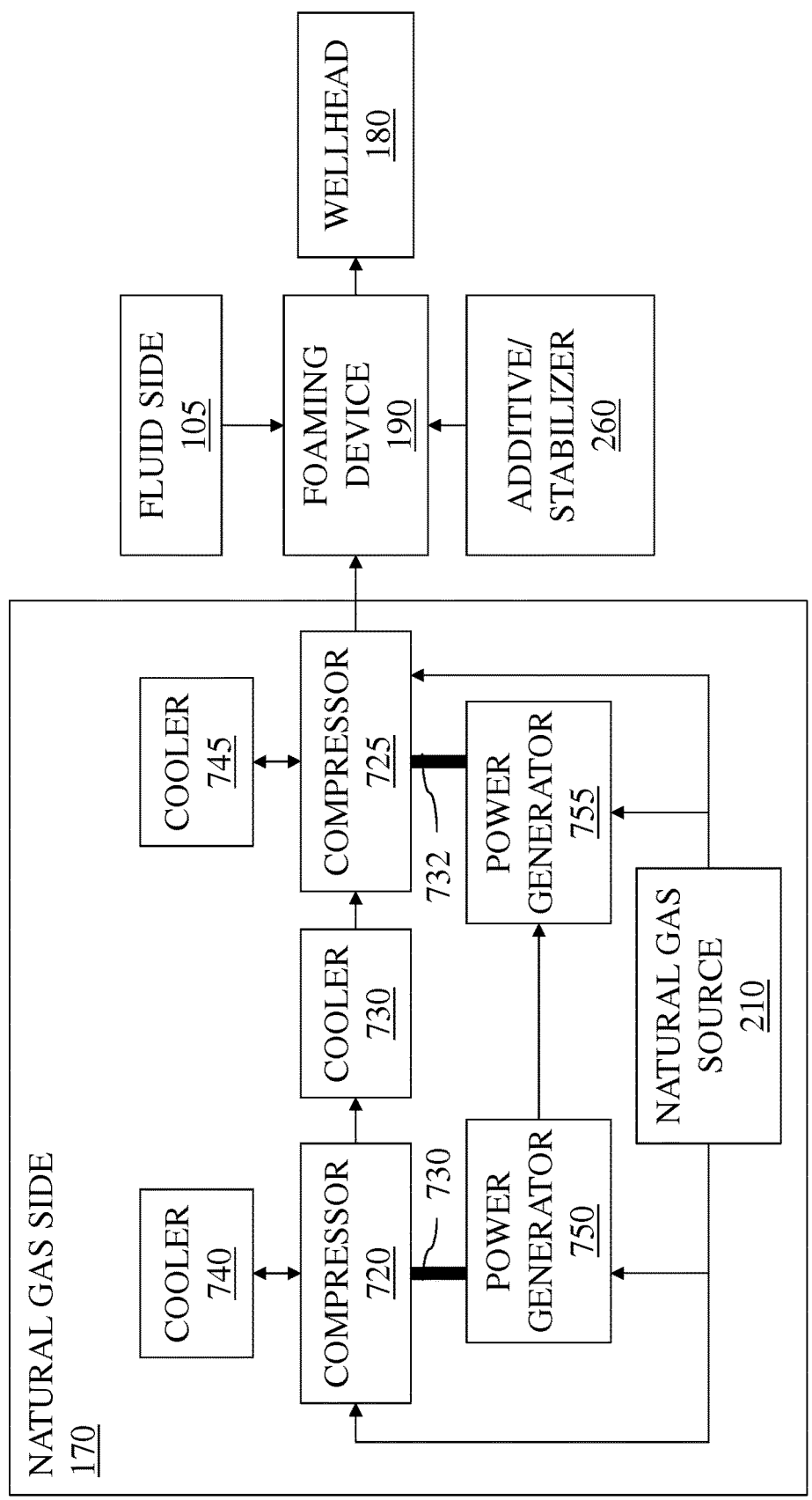

The implementation depicted in FIG. 7 similarly comprises a first turbine drive, electric drive, combustion engine, and/or other power generator 750 powering a first single/multi-stage compressor 720 via a rotating shaft 730, as well as a second turbine drive, electric drive, combustion engine, and/or other power generator 755 powering a second single/multi-stage compressor 725 via a rotating shaft 732. The second compressor 725 is in fluid communication between the first compressor 720 and the wellhead 180 to, for example, further compress the compressed natural gas received from the first compressor 720. Exhaust generated from the first power generator 750 may be utilized (e.g., via a recovery system as described above) to drive the second power generator 755, such as where the second power generator 755 is or comprises a combustion engine fueled by the exhaust of the first power generator 750. One or more coolers 730, 740, and 745 may be operable (perhaps in conjunction with a heat recovery system as described above) to capture hot exhaust gas from the first and second compressors 720 and 725. The first and second compressors 720 and 725 and the first and second power generators 750 and 755 may be powered by natural gas received from the natural gas source 210.

Figure 8:
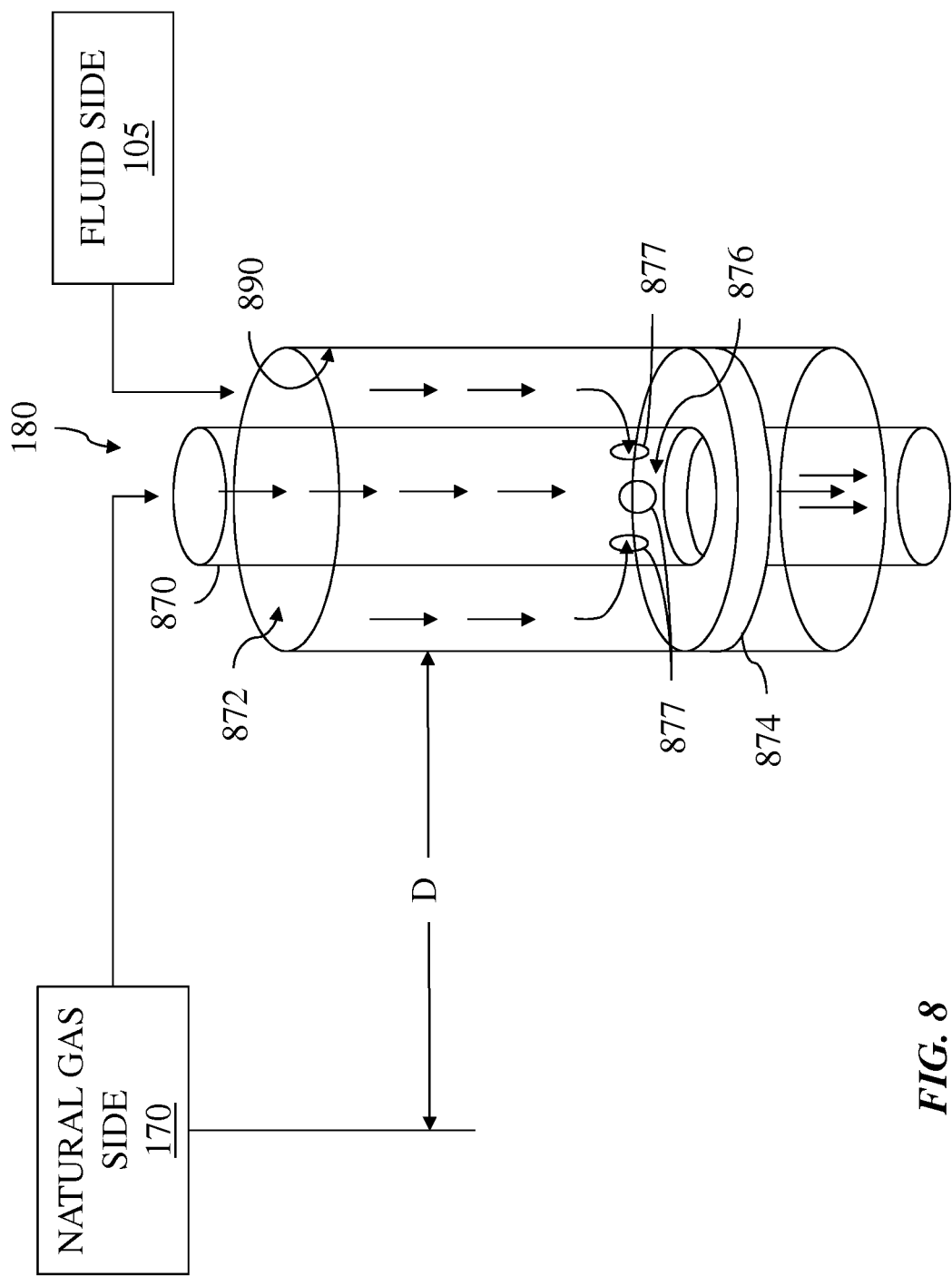
FIGS. 8 and 9 depict an example downhole injection point of a natural gas component of fracturing fluid in accordance with one or more aspects of the present disclosure.

In combination with one or more of the implementations described above or otherwise within the scope of the present disclosure, or independent therefrom, mixing of the natural gas stream and the fluid/water stream may be performed downhole by, for example, a mixer disposed in the wellbore at a distance of at least about 60 meters below the wellhead 180. One such implementation is depicted in FIG. 8, in which a natural gas component from the natural gas side 170 may be injected at the wellhead 180 and down a tubular 870. Water and/or another liquid component from the fluid side 105 may simultaneously be injected at the wellhead 180 and down annulus 872 surrounding the tubular 870. A mixer 876 disposed in the wellbore 890 is in fluid communication with the output stream from the natural gas side 170 and the output stream from the fluid side 105. One or more orifices 877 extending through walls of the tubular 870 may form the mixer 876. The orifices 877 are collectively operable to enable mixing of fluids received from the fluid side 105 and the natural gas side 210. In the similar implementation depicted in FIG. 9, the tubular 870 is a first tubular 870, and a second tubular 878 disposed in the annulus 872 is configured to conduct a substance such as a liquid comprising at least one of a solid, a liquid phase, and a gas phase into the wellbore.

Figure 9:
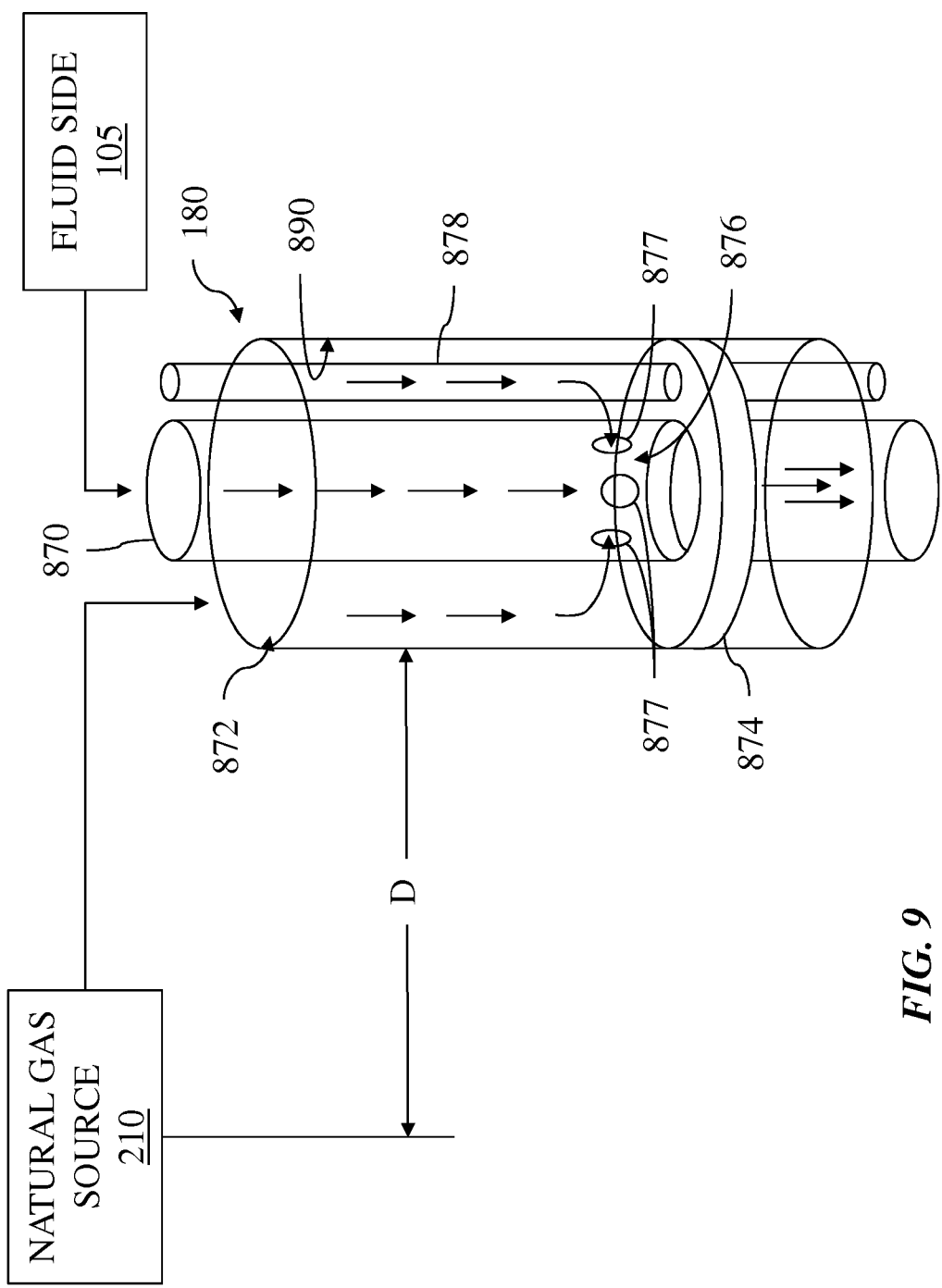

In the implementations shown in FIGS. 8 and 9, the tubular 870 may be one or more of various tubulars suitable for fluid delivery downhole, such as coiled tubing, production tubing, a drill string, a casing, or the like. The tubular 870 is perforated by the orifices 877 to form the mixer 876, and may be sealed by a packer 874 such that the liquid or water component may enter the inside of the tubular 870 and continue down the tubular 870 to the point of injection into the formation further downhole than the orifices 876. The packer 874 is disposed in the annulus 872 further downhole than the mixer 876, thus forming an uphole portion of the annulus 872 and a downhole portion of the annulus 872. The tubular 870 may also or instead be provided in a casing without a packer or orifices, and allowing the above-described stream mixing at a distal end of the tubular 870.

The pressure of the flow stream in the annulus 872 (whether from the natural gas side 170 or the fluid side 105) may be maintained at a higher pressure than the flow stream in the tubular 870 (from the other of the natural gas side 170 or the fluid side 105) such that fluid may enter the interior of the tubular 870 via the mixer 876. In other implementations, the pressure of the flow stream in the annulus 872 may be maintained at a lower pressure than the flow stream in the tubular 870, such that fluid may enter the interior of the annulus 872 via the mixer.

Delivering the gas stream and the liquid stream downhole in separate, single phases, such as to generate foam, may reduce friction resulting from pumping foam in the tubular 870, and may aid in managing the thermal effects of each phase. For example, the temperature of each phase may be equalized, or nearly equalized, by the mixing point at which the foam is formed. Thus, if about 5,000 psia of pressure is needed downhole for stimulation of the subterranean formation, the foam may be pumped at about 8,000 psia from surface due to friction in the tubular 870. However, with two separate phases, the surface pressure may be reduced to from about 8,000 psia at surface to about 6,000 psia or 7,000 psia. Reduction of the surface pressure reduces the amount of horsepower utilized for compression, which reduces the amount fuel utilized for compression, which may save costs and/or improve environmental impact.

Providing separate flow streams downhole may also allow an operator to manage the thermal effects of each phase, which may reduce the thermal shock experienced by introducing two fluids at two extreme temperature differences. For example, the hot gas stream may be provided at temperatures in excess of about 200 deg F., while the liquid stream may be provided at temperatures below about 100 deg F., but not freezing. Travel along the tubular 870 in separate flow streams allows the temperature of each phase to equalize, or nearly equalize, prior to mixing downhole.

It should be noted that while only two separate downhole flow streams are shown in FIG. 8, more than two flow streams may be provided, such as to separately introduce liquids containing solids (such as proppant), a liquid phase, and a gas phase, or various combinations thereof. It should also be noted that the pressure of the flow stream in the annulus 872 may be managed to provide fluid at a higher pressure than the flow stream in the tubular 870, such that fluid may enter the interior of the tubular 870 via the mixer 876.

The systems and methods introduced in the present disclosure are susceptible to various modifications, variations, and/or enhancements without departing from the scope of the present disclosure. For example, specific material or coating choices may be made to protect the piping, compressors, tubulars, wellhead, collars, seals, and other equipment from the extreme temperatures and temperature differences proposed by the present disclosure Likewise, specific material or coating choices may be made to protect the equipment from damage induced by contact with sour gas. Accordingly, the present disclosure expressly encompasses all such modifications, variations, and enhancements within its scope.

In view of all of the above, a person having ordinary skill in the art should readily recognize that the present disclosure introduces an apparatus comprising: a fracturing fluid source in fluid communication with a wellbore extending into a subterranean formation; a natural gas source; a compressor having an input in fluid communication with the natural gas source, having an output in fluid communication with the wellbore, and operable to compress natural gas received at the input for delivery at the output; and a liquefied gas source in fluid communication with the wellbore.

The natural gas source may be disposed within a transportable distance/kilometer of the wellbore. The natural gas source may produce natural gas from a well located at a distance less than about five kilometers from the compressor. The natural gas source may be directly coupled to the compressor. The natural gas source may be located in a same formation as the wellbore.

The liquefied gas source may comprise liquefied natural gas, liquefied carbon dioxide, and/or liquefied nitrogen. The apparatus may further comprise a cryogenic pump operable to pressurize the liquefied natural gas, liquefied carbon dioxide, or liquefied nitrogen received from the liquefied gas source before communication to the wellbore. The cryogenic pump may pressurize the liquefied natural gas, liquefied carbon dioxide, or liquefied nitrogen at a pressure substantially equal to or greater than an outlet pressure of the compressor.

A pressure of fracturing fluid in the fracturing fluid source may be maintained higher than a pressure of natural gas in the natural gas source.

The apparatus may further comprise a foaming device in fluid communication with the compressor, the fracturing fluid source, and the wellbore. The foaming device may be operable to form a foamed fluid comprising compressed natural gas received from the compressor and fracturing fluid received from the fracturing fluid source for delivery to the wellbore. The foaming device may be further operable to receive a polymer also utilized to form the foamed fluid. The foaming device may be further operable to receive a cross-linked polymer stabilizer also utilized to form the foamed fluid.

The natural gas source may comprise a pressure vessel containing liquefied natural gas, compressed natural gas, or gas hydrates.

The apparatus may further comprise a fracturing pump in fluid communication between the fracturing fluid source and the wellbore. The fracturing pump may comprise a combustion engine in fluid communication with the natural gas source.

The apparatus may further comprise a cooler in fluid communication between the compressor output and the wellbore and operable to cool the compressed natural gas received from the compressor.

The compressor may generate thermal energy utilized by a heat recovery system during fracturing operations within the wellbore. The heat recovery system may generate an electrical or mechanical power output from the thermal energy generated by the compressor.

The apparatus may further comprise an injector in fluid communication between the compressor and the wellbore and operable to inject a pressurized cooling chemical into the compressed natural gas before delivery to the wellbore. The cooling chemical may comprise liquefied natural gas, liquefied nitrogen, and/or liquefied carbon dioxide.

The apparatus may further comprise an injector in fluid communication between the natural gas source and the compressor and operable to inject a pressurized cooling chemical into natural gas received from the natural gas source before delivery to the compressor. The cooling chemical may comprise an alcohol, liquefied natural gas, liquefied nitrogen, and/or liquefied carbon dioxide.

The compressor input may be a fluid input and the apparatus may further comprise a power generator having an output shaft operatively coupled to a mechanical input of the compressor. The power generator may comprise a combustion engine in fluid communication with the natural gas source. The compressor may be a first compressor, the power generator may be a first power generator, the combustion engine may be a first combustion engine, and the apparatus may further comprise: a second turbine comprising a second combustion engine in fluid communication with an exhaust of at least one of the first turbine and the first combustion engine; and a second compressor in fluid communication between the output of the first compressor and the wellbore and operable to further compress the compressed natural gas received from the first compressor.

The apparatus may further comprise a mixer disposed in the wellbore, wherein the mixer may be in fluid communication with the fracturing fluid source and the compressor. The mixer may be in fluid communication with a tubular disposed within the wellbore and an annulus defined between the tubular and the wellbore, and the fracturing fluid source and the compressor may be in fluid communication with respective ones of the tubular and the annulus. The pressure of a flow stream in the annulus may be managed to provide fluid at a higher pressure than the flow stream in the tubular such that fluid may enter the interior of the tubular via a plurality of orifices in the tubular. The pressure of a flow stream in the annulus may be managed to provide fluid at a lower pressure than the flow stream in the tubular such that fluid may enter the interior of the annulus via a plurality of orifices in the tubular. The fracturing fluid source may be in fluid communication with the tubular, and the compressor may be in fluid communication with the annulus. The compressor may be in fluid communication with the tubular, and the fracturing fluid source may be in fluid communication with the annulus. The tubular may comprise a plurality of orifices collectively operable to enable mixing of fluids received from the fracturing fluid source and the compressor. The apparatus may further comprise a packer disposed in the annulus and forming an uphole portion of the annulus and a downhole portion of the annulus, wherein the packer may be disposed further downhole than the plurality of orifices. The tubular may be a first tubular and the apparatus may further comprise a second tubular disposed in the annulus and configured to conduct a substance into the wellbore. The substance may comprise a liquid comprising at least one of a solid, a liquid phase, and a gas phase.

The present disclosure also introduces a method comprising: conducting natural gas from a natural gas source located at a wellsite to a compressor located at the wellsite; compressing the natural gas via operation of the compressor; mixing the compressed natural gas with a fracturing fluid received from a fracturing fluid source located at the wellsite, thereby forming a pressurized mixture; and fracturing a subterranean formation by introducing the pressurized mixture into a wellbore extending from the wellsite into the subterranean formation. The mixing may occur at the wellsite and/or in the wellbore at a depth of at least about 60 meters.

The foregoing outlines features of several embodiments so that a person having ordinary skill in the art may better understand the aspects of the present disclosure. A person having ordinary skill in the art should appreciate that they may readily use the present disclosure as a basis for designing or modifying other processes and structures for carrying out the same purposes and/or achieving the same advantages of the embodiments introduced herein. A person having ordinary skill in the art should also realize that such equivalent constructions do not depart from the spirit and scope of the present disclosure, and that they may make various changes, substitutions and alterations herein without departing from the spirit and scope of the present disclosure.

The Abstract at the end of this disclosure is provided to comply with 37 C.F.R. §1.72(b) to allow the reader to quickly ascertain the nature of the technical disclosure. It is submitted with the understanding that it will not be used to interpret or limit the scope or meaning of the claims.

What is claimed is:

1. An apparatus, comprising:
   a fracturing fluid source in fluid communication with a wellbore extending into a subterranean formation, the fracturing fluid source comprising fracturing fluid and water;
   a natural gas source;
   a compressor having an input in fluid communication with the natural gas source, having an output in fluid communication with the wellbore, and operable to compress natural gas received at the input for delivery at the output;
   a heat recovery system to receive thermal energy from the compressor, the thermal energy to alter temperature of the fracturing fluid, water, or compressed natural gas, wherein a pressure of the fracturing fluid is at a higher pressure relative to a pressure of the compressed natural gas; and
   a liquefied gas source in fluid communication with the wellbore.

2. The apparatus of claim 1 wherein the liquefied gas source comprises a liquefied gas selected from the group consisting of:
   liquefied natural gas;
   liquefied carbon dioxide; and
   liquefied nitrogen.

3. The apparatus of claim 2 further comprising a cryogenic pump operable to pressurize the liquefied gas received from the liquefied gas source before communication to the wellbore.

4. The apparatus of claim 3 wherein the cryogenic pump pressurizes the liquefied gas at a pressure substantially equal to or greater than an outlet pressure of the compressor.

5. The apparatus of claim 1 further comprising a foaming device in fluid communication with the compressor, the fracturing fluid source, and the wellbore, wherein the foaming device is operable to form a foamed fluid comprising compressed natural gas received from the compressor and fracturing fluid received from the fracturing fluid source for delivery to the wellbore.

6. The apparatus of claim 5 wherein the foaming device is further operable to receive a polymer also utilized to form the foamed fluid.

7. The apparatus of claim 5 wherein the foaming device is further operable to receive a cross-linked polymer stabilizer also utilized to form the foamed fluid.

8. The apparatus of claim 1 wherein the natural gas source comprises a pressure vessel containing a natural gas product selected from the group consisting of:
   liquefied natural gas;
   compressed natural gas; and
   gas hydrates.

9. The apparatus of claim 1 further comprising a fracturing pump in fluid communication between the fracturing fluid source and the wellbore, wherein the fracturing pump comprises a combustion engine in fluid communication with the natural gas source.

10. The apparatus of claim 1 further comprising a cooler in fluid communication between the compressor output and the wellbore and operable to cool the compressed natural gas received from the compressor.

11. The apparatus of claim 1 further comprising an injector in fluid communication between the compressor and the wellbore and operable to inject a pressurized cooling chemical into the compressed natural gas before delivery to the wellbore, wherein the cooling chemical is selected from the group consisting of:
   liquefied natural gas;
   liquefied nitrogen; and
   liquefied carbon dioxide.

12. The apparatus of claim 1 further comprising an injector in fluid communication between the natural gas source and the compressor and operable to inject a pressurized cooling chemical into natural gas received from the natural gas source before delivery to the compressor, wherein the cooling chemical is selected from the group consisting of:
   methanol;
   ethanol;
   liquefied natural gas;
   liquefied nitrogen; and
   liquefied carbon dioxide.

13. The apparatus of claim 1 wherein the compressor input is a fluid input and the apparatus further comprises a power generator having an output shaft operatively coupled to a mechanical input of the compressor, wherein the power generator comprises a combustion engine fueled by the natural gas source.

14. The apparatus of claim 1 further comprising a mixer disposed in the wellbore, wherein the mixer is in fluid communication with the fracturing fluid source and the compressor.

15. The apparatus of claim 14 wherein the mixer is in fluid communication with a tubular disposed within the wellbore and an annulus defined between the tubular and the wellbore, and wherein the fracturing fluid source and the compressor are in fluid communication with respective ones of the tubular and the annulus.

16. The apparatus of claim 15 wherein the mixer comprises a plurality of orifices extending through walls of the tubular and collectively operable to enable mixing of fluids received from the fracturing fluid source and the compressor.

17. The apparatus of claim 15 further comprising a packer disposed in the annulus and forming an uphole portion of the annulus and a downhole portion of the annulus, wherein the packer is disposed further downhole than the plurality of orifices.

18. A method, comprising:

conducting natural gas from a natural gas source located at a wellsite to a compressor located at the wellsite;

compressing the natural gas via operation of the compressor;

mixing the compressed natural gas with a fracturing fluid received from a fracturing fluid source located at the wellsite, thereby forming a pressurized mixture, wherein a pressure of the fracturing fluid is at a higher pressure relative to a pressure of the compressed natural gas;

receiving thermal energy from the compressor to alter temperature of the fracture fluid or compressed natural gas; and fracturing a subterranean formation by introducing the pressurized mixture into a wellbore extending from the wellsite into the subterranean formation.

19. The method of claim 18 wherein the mixing occurs at the wellsite.

20. The method of claim 18 wherein the mixing occurs in the wellbore at a depth of at least about 60 meters.

* * * * *